United States Patent Office 3,131,619
Patented May 5, 1964

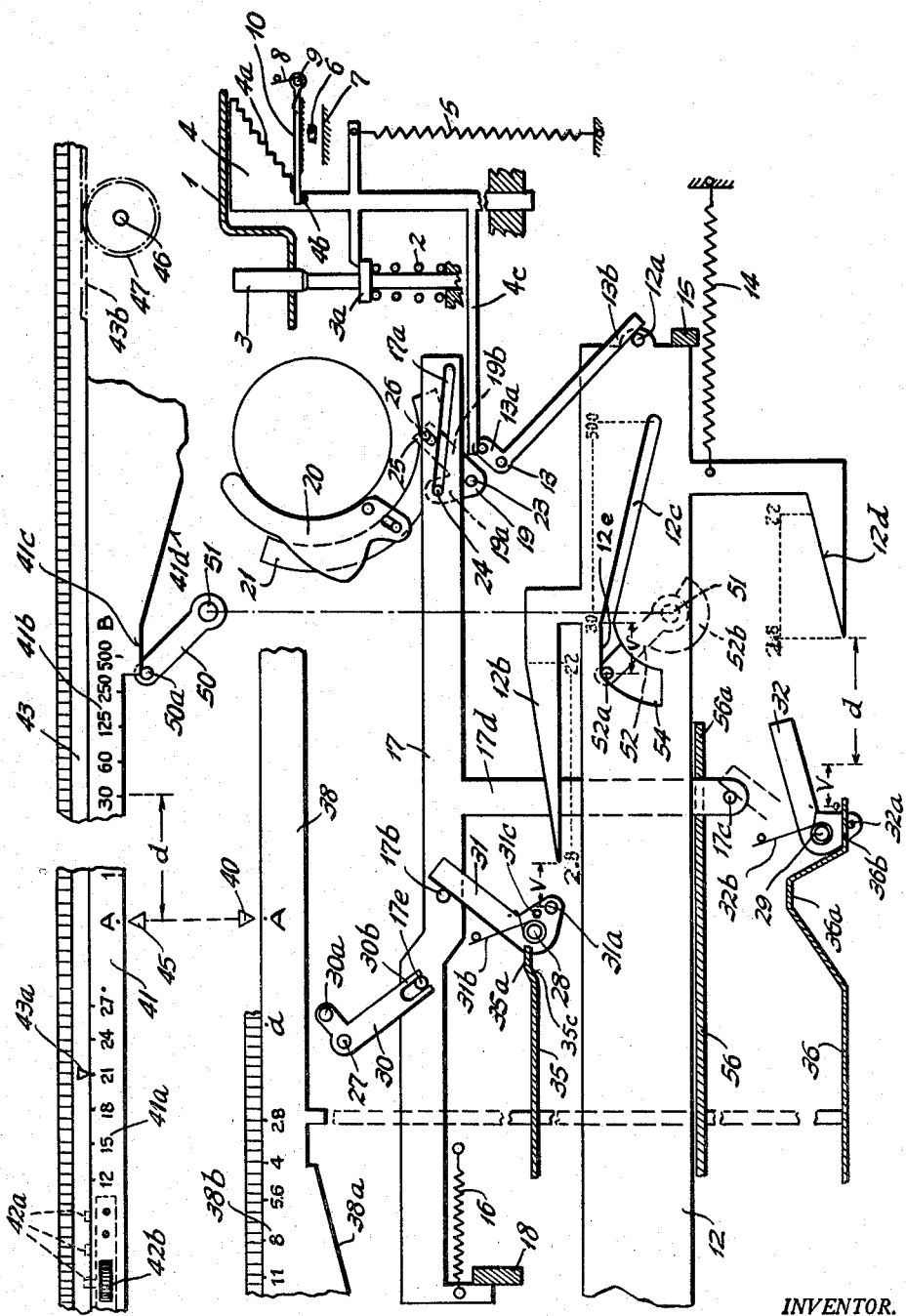

3,131,619
PHOTOGRAPHIC CAMERA HAVING A BUILT-IN EXPOSURE METER AND MEANS FOR OPERATING THE CAMERA AUTOMATICALLY OR MANUALLY
Waldemar T. Rentschler, Calmbach (Enz), Germany, assignor to Alfred Gauthier, G.m.b.H., Calmbach (Enz), Germany, a corporation of Germany
Filed June 6, 1962, Ser. No. 200,561
Claims priority, application Germany June 9, 1961
7 Claims. (Cl. 95—10)

This invention relates to a photographic camera having a built-in exposure meter and means for setting the operation of the camera for either manual operation of the diaphragm or automatic operation in response to the light intensity, after a setting has been made for the sensitivity of the film, and after the exposure time of the camera has been set.

In accordance with the invention, the diaphragm of a camera may be operated automatically in either of two ways under the control of an exposure meter built into the camera. The lamellae that control the size of the aperture may be positioned, as the shutter mechanism is operated to take a picture, by means of a linkage which is connected both to the shutter trigger and to the exposure meter. This linkage includes a first member connected to the lamellae and a second member connected to the shutter trigger and to the exposure meter. The second member has a plurality of cam surfaces, two of which are linked to operate the first member by means of followers that engage the first member. These two followers are controlled by means of the diaphragm setting mechanism of the lens so that only one of them is operative at a time; the first one may be rendered operative by placing the diaphragm control member in a first automatic position and the second follower may be brought into operation when the diaphragm control member is moved to a second automatic position. Alternatively, the diaphragm control member may be moved to an area over which manual control of the first member and thus of the diaphragm aperture size is operated directly through yet another cam surface and cam follower linking the diaphragm control member to the first member. When the diaphragm control member is moved to the manual control area, both the first and second cam followers are moved to inoperative positions.

Further in accordance with the invention, the duration of exposure may be controlled automatically by the exposure meter by means of another cam surface on the second member, which moves under the control of the exposure meter, and a cam follower that engages this last named cam surface and actuates the duration controlling mechanism of the shutter. This automatic mechanism for controlling the duration of exposure is brought into operation when the exposure duration control member of the camera is moved to an automatic position. When the exposure duration control member is set for automatic operation, and the diaphragm control member is placed in its first automatic position, the duration of exposure and the diaphragm aperture size are jointly controlled according to a predetermined time-diaphragm program. Alternatively, the duration of exposure may be controlled manually by the exposure duration control member to a desired setting. Then, by moving the diaphragm control member to the second automatic position, the aperture size is determined in accordance with the manually set exposure duration and under the control of the exposure meter. In this case the cam follower that controls the duration of exposure is disengaged from its cam surface on the second member.

One of the principal objects of this invention is to provide in one mechanism means for operating both the diaphragm and shutter of a camera under automatic control of a built-in exposure meter or to operate the shutter manually and the diaphragm mechanism automatically or to operate both the shutter mechanism and the diaphragm mechanism manually. Further objects will be apparent from a study of the following specification, which, together with the illustrative drawing, describes one embodiment of the present invention.

In the drawing, the setting members, which are normally constructed in the form of rings or discs, are diagrammatically illustrated and described as bars or slides in order to clearly show the various components and the functional connections therebetween. Further the drawing only shows those parts of the usual intra-lens shutter which are necessary to describe the present invention. The camera itself comprises a housing 1 containing a coil spring 2 which guides and positions a movable shutter-actuating pin or release member 3. The release member is provided with an intermediate collar, or flange, 3a which is engaged by the coil spring 2 to normally urge the release member into position with its upper portions extending outside of the housing.

The present camera construction accomplishes several results utilizing a minimum number of parts. When the automatic exposure setting is used, the release member 3 cooperates with a sensing member 4 which is provided with a stepped cam 4a, pin 4b and driving arm 4c. To effect this cooperation a spring 5, normally urges the sensing member 4 into engagement with the collar 3a on the release member 3. The release member is not moved by this engagement due to the fact that spring 5 is not as strong as coil spring 2. A pointer or indicator 6 is connected to and movable back and forth, parallel to the surface of a support member 7, by a well known built-in light intensity measuring device (not shown). The fixed member 7 is associated with indicator 6 and extends over the entire area of the movement of the pointer. A clamping lever 10 is rotatably mounted at one end about a fixed axis 9. A relatively weak coil spring 8 urges the clamping lever 10 into engagement at its other end with fixed pin 4b.

When the release member 3 is depressed to take a picture, the collar 3a is removed as a support for the sensing member 4. Under the influence of spring 5 the sensing member is urged toward the pointer or indicator until one of the stepped cam portions 4a rest upon the pointer or indicator 6. Since the pointer 6 may not be squarely under one of the steps 4a at the time a picture is to be taken, it is desirable to clamp it momentarily in place against the support member 7. For this purpose, immediately before the engagement of the pointer 6 and stepped cam 4a the pointer is arrested by the lower surface of the clamping lever 10. It may be desirable to roughen the lower surface of the clamping lever, as shown, in order to increase the frictional engagement between it and the pointer 6.

The driving arm 4c extending from the lower portion of the sensing member 4 is operatively connected to a setting slide 12 by means of an interposed angle lever 13. To establish this operative connection the driving arm 4c engages one arm 13a of the angle lever 13 whose other arm 13b engages a pin 12a at one end of the slide 12. A spring 14 normally urges the slide into its starting position in which one end of the slide engages a fixed stop 15. It will be understood that when the automatic exposure setting hereinafter described is used, and the release member 3 is depressed, the sensing member 4 will move to a position determined by the movement of the indicator 6. The movement of the sensing member is imparted to driving arm 4c and angle lever 13 thereby causing the slide 12 to move to a specific position originally determined by the extent of movement.

To accomplish exposures using the automatic exposure setting in response to intensity of light and using a predetermined time-diaphragm program, the slide 12 is provided with a diaphragm-setting cam 12b covering diaphragm values ranging from f2.8 to f22 and an exposure time setting cam 12c. The time setting cam 12c cooperates in a well known manner with an exposure time escapement mechanism (not shown) built into the intralens shutter whereby the camera may be set for exposure times ranging from 1/30 sec. to 1/500 sec., for example. The setting cams 12b and 12c are so constructed that the time-diaphragm combinations, from 1/30 sec. and f2.8 diaphragm to 1/500 sec. and f22 diaphragm, are continuously self-adjustable during the movement of the slide.

The time-diaphragm setting cams 12b and 12c provide for a predetermined program when the camera is used in the fully automatic position. In addition, according to the present invention the diaphragm may operate automatically upon manual setting of the exposure time. For this purpose the slide 12 is provided with another diaphragm setting cam 12b which also obtains diaphragm aperture values ranging from f2.8 to f22.

As shown in the drawing, a diaphragm actuating slide 17 is normally urged by spring 16 into engagement at one end with a fixed stop 18. At its other end, the slide 17 operatively effects the opening and closing of the diaphragm lamellae 20. The slide 17 is provided with a central cam slot 17a. An angle lever 19 is rotatably positioned about a fixed axis 23. One arm 19a of the angle lever carries a pin 24 which is accommodated by and slidably guided in the central slot 17a. The other arm 19b of the angle lever 19 has a forked terminal 25. An adjustable setting ring 21 carries a pin 26 which engages the forked terminal 25 of the angle lever 19. The slide 17 is provided with pins 17b, 17c and 17e for the purposes hereinafter set forth.

Three two-armed levers 30, 31 and 32 are pivotally disposed about fixed axis 27, 28 and 29 respectively. One end of each of these levers carries a pin 30a, 31a and 32a, respectively, which serves as a cam follower through which the motion of the respective lever is controlled.

The lever 30 has a forked end 30b which embraces the the pin 17e on the diaphragm actuating slide 17. The other two levers 31 and 32 are biased by means of coil springs 31b and 32b, respectively, in a direction urging the levers against the pins 17b and 17c, respectively, on the slide 17. While the pin 17b is directly on the slide, the pin 17c is located, for the sake of convenience, on the end of an arm 17d that extends from the slide 17. Associated with each of the two levers 31 and 32 are two control members having edges 35 and 36 that govern the operation of the levers 31 and 32, respectively. Both of these edges 35 and 36 may be combined into a single control member, if desired, and both are connected to a diaphragm setting, or control, member 38.

The control member 38, which is shown in the form of a slide for the purpose of simplifying the drawing, although it may be a ring, includes a diaphragm setting cam 38a and a diaphragm scale 38b with numerical indicia that indicate the size of the diaphragm aperture and with two additional symbols "a" "A" that indicate two automatic settings in accordance with this invention. The positioning of the diaphragm setting member 38 is indicated by a fixed pointer 40, which may be arranged either on the camera case or on the shutter housing.

The control means that make up this invention also include a member 41 that controls the duration of the exposure time and is therefore referred to as the exposure time setting member. This member is releasably connected to a film sensitivity setting device 43 which has a plurality of notches 42a and a member 42b that locks into the notches. Numerical indicia 41a indicate different film sensitivities and the position of the film sensitivity setting member 43 with respect to the indicia 41a is shown by a pointer 43a.

In addition to the film sensitivity scale 41a, the exposure time setting member 41 also has a setting position marked "A," which indicates the proper setting of the member 41 to obtain automatic control of the exposure duration in response to light intensity received by the built-in exposure meter and transmitted by way of the slide 12. The setting member 41 has, in addition, a group of numerical indicia of shutter speed, or the duration of opening of the shutter 41b, and these indicia together with the mark "A" are used with reference to a pointer 45 that is located on the camera or the shutter housing and, as shown in the drawing, that may be directly opposite the pointer 40. The arrangement of the exposure time setting scale 41b with respect to the automatic position indicated by the letter "A" is such that there is a distance "d" between the setting position "A" and the mark that indicates 1/30 of a second. The significance of this distance "d" will be explained hereinafter. The setting member 41 also has a cam with a horizontally extending portion 41c and an inclined portion 41d. The inclined portion corresponds to settings of the exposure scale 41b between one second and 1/500 of a second.

The mechanism for adjusting the film sensitivity setting member 43 includes a rack 43b and pinion 47. The latter is rotatably mounted on a shaft 46. The rack and pinion make it possible to transmit the motions of the film sensitivity setting member 43 to a device, such as the well-known shading device (not shown) of a photocell, and thereby to set the camera or the exposure meter to operate according to the sensitivity of the film being used. Alternatively a change of the film sensitivity setting may result in adjusting a variable resistor that is connected, in a well-known manner, to the circuit of the exposure meter. As another alternative, the adjustment of the film sensitivity setting member 43 may rotate the measuring mechanism of the light intensity measuring device of the exposure meter and thus move the pointer 6. However, these details will not be discussed at length because they are not part of the invention at hand.

A lever 50 engages the cam surfaces 41c and 41d of the exposure time setting member 41 by means of a cam follower pin 50a. The lever 50 is attached to a shaft 51 so that rotation of the lever will transmit the same rotation to the shaft. Another lever 52 is located on the same shaft 51 so as to rotate with the shaft but is free to slide axially along the shaft, at least to a limited extent. This is possible if the shaft is a splined shaft, for example, and the inner surface of the lever 52 has matching teeth that engage the splines but permit the lever to move along the shaft. The axis of the shaft 51 is indicated by a dot and dash line which extends from the lever 50 to the lever 52. The lever 52 has a sensing pin, or cam follower, 52a, which engages another cam surface on the slide 12. This cam surface includes a level portion 12e and an inclined portion 12c both of which may be formed as part of a recess, or opening, in the slide 12. The lever 52 also has a cam surface 52b which engages the edge 56a of a control slide 56 that is firmly connected to the diaphragm control member 38. The connection between the member 38, and the control members 35 and 36, and the control slide 56 is indicated, partly in broken lines, extending from the member 38 to the control member 36.

The invention provides that both the exposure setting member 41 and the diaphragm control member 38 have a special "automatic" position which in each case is indicated by the letter "A." Upon setting both of the members 38 and 41 to the position "A," the exposure time setting mechanism and the diaphragm setting mechanism cooperate in such a way that an automatic exposure setting is obtained in response to the light intensity and the preset film sensitivity and in accordance with a predetermined time-diaphragm program. The control member 38 also has a second automatic position indicated by the letter "a," which permits the opening of the diaphragm to be controlled in response to the light measured by the exposure meter, as indicated by the pointer 6, while the duration of exposure is manually selected.

In accordance with this invention, the arrangement of the levers 30, 31 and 32 is such that their respective cam follower pins 30a, 31a and 32a, are brought into operative position by positioning the diaphragm setting member 38. In the case of the lever 30, its cam follower 30a engages the inclined surface of the cam 38a only when the diaphragm setting member 38 is so positioned with respect to the pointer 40 that the pointer is directly opposite the group of numerical indicia 38b. Within this range of position of the member 38 the amount of rotation of the lever 30 is determined by the point along the cam surface 38a that engages the pin 30a and this angular position of the lever 30 is transmitted via the forked end 30b and the pin 17e to move the slide member 17. As a result of the motion of the slide 17, the crank 19 will be rotated by virtue of the interaction of the pin 24 within the slot 17a, and this will cause the lamellae 20 to extend over the aperture of the camera lens by an amount that depends upon the exact position of the diaphragm setting member 38, thus adjusting the aperture.

When automatic operation of the diaphragm is desired, the member 38 may be moved so that either the letter "a" or "A" is opposite the pointer 40. When the member 38 is in the position shown in the drawing, the lever 31 is against the pin 17b and the pin 31a is in position to intercept the sloping cam surface 12b as the slide 12 moves to the left when the shutter actuating trigger, or release member, 3 is depressed. At the same time section 36b of the control member 36 rests against the pin 32a to hold the latter out of operative position so that it cannot engage the sloping edge of the cam surface 12d and to hold the lever 32 away from the pin 17c.

To change to the alternate automatic position, the member 38 is moved to the left so as to bring the mark "a" directly opposite the pointer 40. By virtue of the direct connection between the control members 35 and 36 and the member 38, this movement of the member 38 causes the surface 35a to engage a pin 31c on the lever 31 and thus rotate the lever 31 clockwise so as to move the cam follower pin 31a to an inoperative position where it will be too low to engage the cam surface 12b. At the same time the control member 36 is moved to the left, which releases the cam follower pin 32a from the flat portion 36b and permits the lever 32 to rotate counterclockwise under pressure from a spring 32b so as to come in contact with the pin 17c, as indicated by the dotted lines. As is also indicated by the small dotted circle, cam follower pin 32a is in position to intercept the sloping cam surface 12d when the slide 12 moves to the left.

Another feature of the arrangement of the two levers 31 and 32 and the respective cams 12b and 12d by which these levers are operated is that cam 12b engages the pin 31a on the lever 31 after the slide 12 has traveled only the preliminary distance "v" to the left, while cam 12d must travel not only the distance "v" but also the aforementioned distance "d" in order to engage the pin 32a of the lever 32. The reason for the initial distance "v" is that when the shutter trigger, or release member 3 is depressed in order to take a picture, the sensing member 4 must move down a short distance before it can engage the pointer 6, even if the pointer 6 is at its extreme leftward position under the very first step 4a of the sensing member 4. During this initial movement of the sensing member 4, the lever 13 is rotated clockwise through a small arc by the pressure of the arm 4c and thereby moves the slide 12 a short distance to the left. This distance is equal to the distance "v." After moving this distance, the end of the cam 12b is in contact with the cam follower pin 31a, and any further leftward motion of the slide 12 causes the lever 31 to rotate counterclockwise at the same time. Since the exposure time setting member 41 is also positioned at the "A" mark, the initial leftward movement of the slide 12 will cause the cam follower pin 52a of the lever 52 to move across the horizontal portion 12e of a recess 54 in slide 12. Further leftward motion of the slide will cause the lever 52 to rotate counterclockwise as the pin 52a moves down the inclined cam surface 12c.

For manual setting of the exposure duration, the diaphragm setting member 38 may be moved to the "a" position. This movement causes the member 56 to move to the right a sufficient distance to engage the cam surface 52b on the lever 52. The lever 52 is thereby moved so as to disengage the pin 52a from the cam surface 12c. Under such circumstances the exposure duration will not be controlled automatically by the exposure meter operating as hereinbefore described by means of the pointer 6, the sensing member 4, and the slide 12 but instead is controlled by the manual setting of the member 41. The diaphragm setting however remains automatically operative by the cooperation between the lever 32 and the setting cam 12d. In this instance, allowance must be made not only for the distance of travel of slide 12 indicated by the letter "v," but also for the distance "d," which the exposure time setting member 41 moves, when it is changed from the setting position "A" (in which the time-diaphragm program in the embodiment starts with the pairing: 1/30 sec.—2.8 diaphragm) to the manually set 1/30 sec. position of the scale 41b. This is necessary because the movement of the exposure time setting member 41 coupled with the film sensitivity setting member 43, affects those members of the film sensitivity setting device which are operatively connected to the light intensity measuring device. However, as hereinbefore set forth, the resulting affect upon the film sensitivity setting device may be adjusted in a simple manner by so positioning the diaphragm setting cam 12d that it engages the lever 32, only after moving the distance "d" as well as the distance "v."

The operation of the above-described setting mechanism is as follows:

To effect a completely automatic operation the two symbols "A" of the exposure time setting member 41 and of the diaphragm setting member 38 are set to coincide with the fixed marks 40 and 45. In this position, when the release member 3 is depressed for the purpose of taking a photograph, the sensing member 4 is pulled downwardly by the tension spring 5 until one of its steps 4a comes to rest on the movable pointer 6 of the exposure meter. In response to this motion of the sensing member 4, the slide 12 is displaced to the left (as shown in the drawing) by the movement of the lever 13 which is operatively connected to the sensing member 4 and the slide 12. The distance traveled by the slide is proportional to the movement of the sensing member 4 until it is halted by the needle 6. The leftward motion of the slide 12, in turn, causes the pin 52a of the lever 52, cooperating with the exposure time escapement mechanism, to travel the distance "v" and thereafter to move downwardly along the setting cam 12c of the slide 12. The exposure time is set in accordance with the final angular position of the lever 52 when the pin 52a comes to rest at some point along the cam 12c. While the exposure time is being set as described, the diaphragm setting cam 12b also becomes operative during the leftward motion of the slide 12. The cam 12b, after traveling the distance "v," engages the pin 31a, thereby pivoting the lever 31 counterclockwise about its axis 28 during further leftward motion. The diaphragm actuating slide 17 is thereby moved, to the left, against the action of its spring 16, and the diaphragm lamellae 20, operatively connected to the lever 19 are brought into a specific position corresponding to the movement of the slide 12. The complete exposure setting, including both the duration of exposure and the diaphragm opening, is thereby controlled in response to the light intensity measuring device and to a predetermined time-diaphragm program, and upon further travel of the release member 3, the shutter is now released for exposing the film in the camera.

As soon as pressure on the release member 3 is removed after taking the picture, the release member is urged upwardly by the compression spring 2 causing the sensing member to return to its starting position. The slide 12 and the diaphragm actuating slide 17 are also returned by their springs 14 and 16 to starting positions abutting the stops 15 and 18, respectively.

To take photographs with an automatic diaphragm setting operative in response to the exposure meter and a manually set exposure time the diaphragm setting member 38 is moved to a point where setting position "a" coincides with the fixed mark 40. In this position, the control members 35 and 36, as well as the control slide 56, are moved simultaneously toward the right. This causes the inclined surface 35c of the control edge 35 to engage the pin 31c of the lever 31, and thereby pivot the lever 31 clockwise about its axis 28 so as to move the pin 31a out of the path of motion of the setting cam 12b of the slide 12. During this process, the movement of the lever 56 causes the cam surface 52b to engage the front face 56a, which is shaped as an inclined edge. Thereby the lever 52 is moved axially causing the pin 52a to become disengaged from the setting cam 12c.

The movement of the setting member 38 causes the control edge 36 to move to the right. When the portion 36b of the control edge 36 is removed from its contact with the pin 32a on lever 32, the pin is released and moves into engagement with the underside of the recessed portion 36a of the control edge 36. Thereupon, the lever 32, under the influence of coil spring 32b, swings about its pivot in a counterclockwise direction. As indicated by the broken lines in the drawing, the free end of the lever 32 then engages the pin 17c of the diaphragm actuating slide 17.

In the foregoing position of the control member 38 there is no connection between the lever 52 and the exposure time escapement mechanism. Therefore, the desired exposure time may be manually set by means of the exposure time setting member 41. For this purpose, it is only necessary to set the desired exposure time value at the fixed mark 45 by moving the exposure time setting member 41 to the left. This movement of the exposure time setting member 41 does not influence the lever 50 (which is operatively connected to the exposure time escapement mechanism) until pin 50a of the lever 50 reaches the inclined portion 41d of the exposure time setting cam 41c, 41d. After the exposure time has been manually set, actuation of the release member 3 affects movement of the sensing member 4 which in the manner hereinbefore described causes movement of the slide 12. However, under these conditions, only the diaphragm setting cam 12d becomes operative. After the cam 12d has traveled the entire path "v"+"d," it engages the pin 32a of the lever 32 and, while rotating this lever, simultaneously moves the diaphragm actuating slide 17 to the left against the action of the spring 16. This movement of the diaphragm actuating slide 17 causes the setting of the diaphragm lamellae in the same manner as hereinbefore set forth.

The camera of the present invention may also be used with completely manually adjustable settings independent of the influence of the light intensity measuring device. To manually set both the exposure time and the diaphragm, the diaphragm setting member 38 need only be moved to the right, until the desired diaphragm value is positioned opposite the fixed mark 40. During this movement, the setting cam 38a of the member 38 engages the pin 30a of the lever 30 and pivots the lever 30 about its axis 27 in a clockwise direction. As a result of the connection between the forked end 30b of the lever 30 and the pin 17e of the diaphragm actuating slide 17, the movement of the lever 30 causes the diaphragm actuating slide 17 to move to the left. The diaphragm lamellae 20 are thereby moved into a position corresponding to the pre-set diaphragm value.

Upon manual setting of the exposure time and of the diaphragm the slide 12 need not move. Therefore, a locking device may be associated with the slide 12. The locking device may become operative as soon as the setting scales 41b and 38b of the exposure time setting member 41 and of the diaphragm setting member 38, respectively, arrive in the range of the fixed marks 45 and 40. Alternatively, the control edges 35 and 36 (which are movable with the control member 38) and the control slide 56 may be so constructed that the levers 31, 32 and 52, cooperating with the slide 12 or with its setting cams 12b, 12c and 12d, are maintained in such position that the leftward movement of the setting cams has no influence on the respective levers.

While the invention has been described in detail with regard to one embodiment thereof it will be understood that such description is for illustrative purposes only and that variations and modifications may be made without departing from the spirit of the invention or the scope of the appended claims.

I claim:

1. A photographic camera comprising: a built-in exposure meter, an adjustable diaphragm, a diaphragm control member settable to a plurality of positions including two distinct automatic positions and a range of manually controlled positions, first means connecting said control member to said adjustable diaphragm when said control member is set to said manually controlled position, a movable member, second means linking said movable member to said exposure meter to control the motion of said movable member at least partly by said exposure meter, third means linking said movable member to said adjustable diaphragm when said control member is set to either of said automatic positions whereby the aperture size of said diaphragm is controlled by the extent of movement of said movable member as influenced by said exposure meter, and fourth means to disable said third means when said control member is set to its manually controlled position.

2. A photographic camera comprising a built-in exposure meter, an adjustable diaphragm, a diaphragm control member settable to a plurality of positions including an automatic position and a manually controlled position, a first adjustable member connected to said adjustable diaphragm to control the aperture thereof, a second movable member operatively connected to said exposure meter whereby the movement of said second movable member is at least partly controlled by said exposure meter, an exposure time setting member settable to a plurality of positions including an automatic position and a manually controlled position, first means linking said second movable member to said exposure time setting member when said exposure time setting member is set to its automatic position, whereby the duration of exposure is automatically controlled by the extent of movement of said second movable member, second means to link said second movable member to said first movable member, whereby the aperture of said diaphragm is controlled by the extent of movement of said second movable member, means connecting said first movable member to said diaphragm control member when said diaphragm control member is set to its manually controlled position, whereby the aperture of said diaphragm is manually controlled, and means operatively associated with said diaphragm control member to disable said first and second means when said diaphragm control member is moved to its manually controlled position.

3. A photographic camera having a built-in exposure meter, first adjustable means settable to a manually controlled position and to an automatic position for setting the duration of exposure, an adjustable diaphragm, second adjustable means settable to a manually controlled position and to an automatic position for controlling said diaphragm, and third means operatively connected to said exposure meter to control both said diaphragm and said means for setting the duration of exposure in accordance with a predetermined time-diaphragm program and in response to the light intensity on said exposure meter, fourth means operatively connected to said third means for modifying the operation of said third means in accordance with the sensitivity of the film in the camera, said second adjustable means being settable to a second automatic position, and said camera being provided with means to disable a portion of said first adjustable means when said second adjustable means is set to said second automatic position whereby said diaphragm is controlled in accordance with the intensity of light on said exposure meter and in accordance with the film sensitivity, and the duration of exposure is manually controlled.

4. A photographic camera comprising a built-in exposure meter, an adjustable diaphragm, a diaphragm control member operatively connected to said diaphragm, said control member having a manual setting range and an automatic setting range whereby in the automatic setting thereof the diaphragm is automatically set in response to the light intensity as indicated by said meter after the film sensitivity and exposure time have been set, and in the manual setting range of said diaphragm control member the diaphragm setting is affected independently of the influence of the exposure meter by manual operation of said control member, and said control member having a second automatic setting range, and an exposure time setting member having an automatic setting range whereby the simultaneous setting of said exposure time setting member to its automatic setting range and control member to said second automatic setting respectively cooperate to effect an automatic exposure setting according to a firmly preset time diaphragm program in response to the light intensity and the preset film sensitivity.

5. The invention as defined in claim 4 and including a slide operatively associated with said exposure meter serving for automatically setting said diaphragm in accordance with the setting of said control member, said slide having cam means and cooperating followers whereby when said control members is set at said second automatic setting and said exposure time setting member set at its automatic setting cooperate to effect said automatic setting according to preset time-diaphragm program in response to light intensity.

6. A photographic camera comprising a built in exposure meter, an adjustable diaphragm, a diaphragm control member operatively associated with said diaphragm to effect the adjustment thereof, said control member having a manual setting range and a first and second automatic setting range, an exposure time setting member having a manual range and an automatic range, and means whereby the diaphragm is automatically set in response to the light intensity when said control member is set in said first automatic setting range after the film sensitivity and specific exposure time has been set by said exposure time setting member, and whereby in the manual setting range of said diaphragm control member a diaphragm setting is effected independently of the influence of said exposure meter, and whereby in the simultaneous setting of said control setting member in its second automatic setting and said exposure time setting member to its automatic setting cooperate to effect an automatic exposure according to a firmly preset time diaphragm program in response to the light intensity and preset film sensitivity.

7. A photographic camera comprising a built in exposure meter, an adjustable diaphragm, a diaphragm actuating member operatively connected to said diaphragm, a diaphragm control member for effecting the adjustment of said diaphragm, said control member having a manual setting range and a first and second automatic setting range, a slide operatively associated with said exposure meter, and an exposure time setting member having a manual range and an automatic range operatively associated with said slide, said slide having first cam means and followers rendered operations for setting the diaphragm automatically in response to the light intensity when said control member is set in said first automatic setting range after the film sensitivity and specific exposure time has been set by said exposure time setting member, and said slide having a second cam means and follower rendered operative for setting the diaphragm automatically in response to the light intensity according to a preset time-diaphragm program when the setting of said control setting member is set to its second automatic position and said exposure time setting member is set to its automatic setting.

References Cited in the file of this patent
UNITED STATES PATENTS

| | | |
|---|---|---|
| 2,969,004 | Gebele | Jan. 24, 1961 |
| 3,013,478 | Gebele | Dec. 19, 1961 |